T. C. ADAMS.
SAW SET.
APPLICATION FILED OCT. 31, 1910.
999,356.
Patented Aug. 1, 1911.
2 SHEETS—SHEET 1.
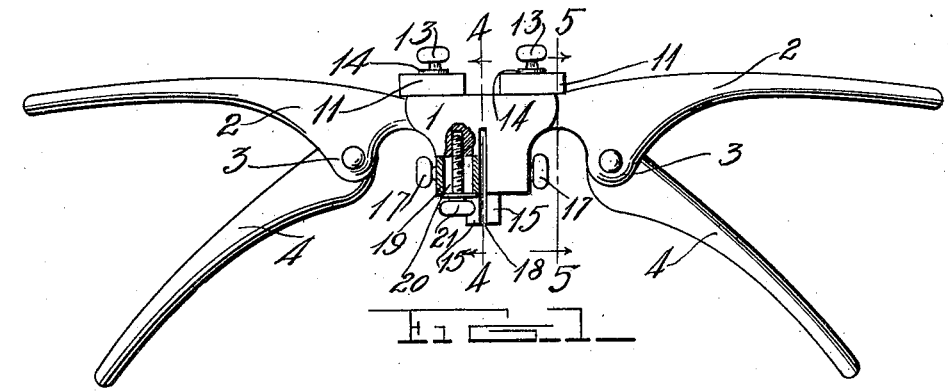
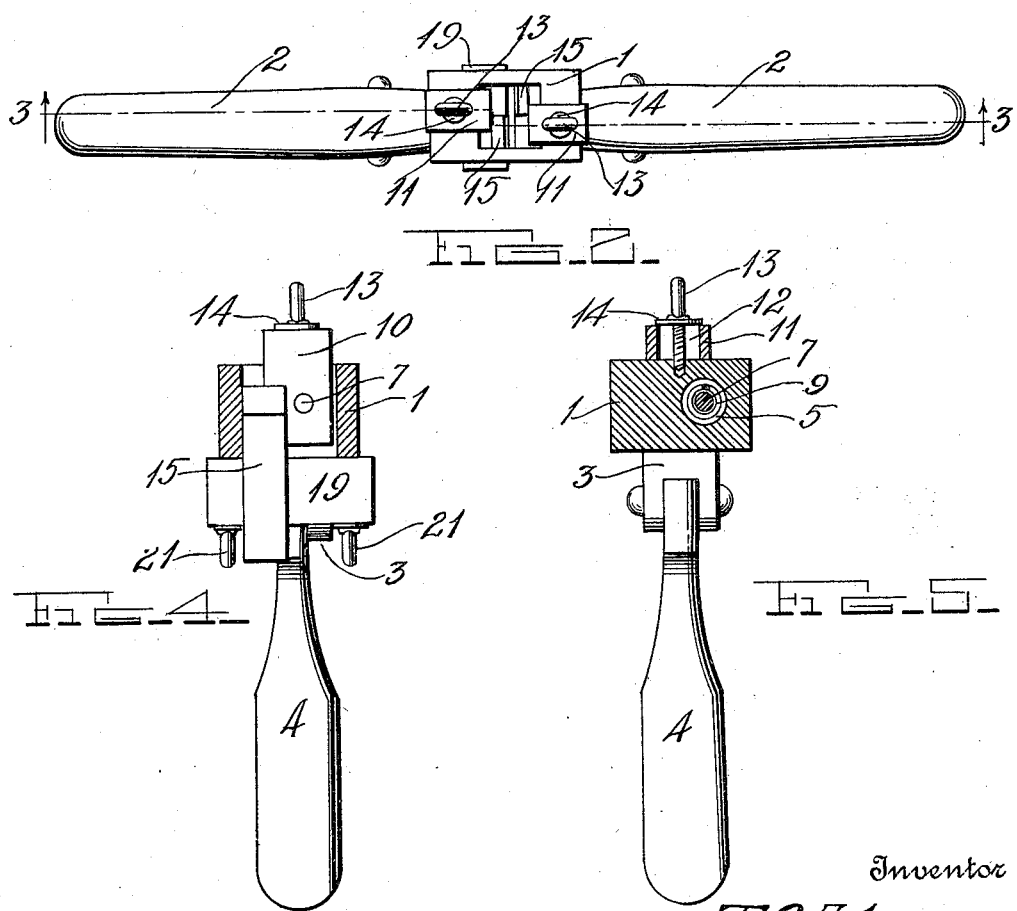
Witnesses
J. R. Pierce
O. B. Hopkins
Inventor
T. C. Adams.
by H. B. Willson & Co
Attorneys
COLUMBIA PLANOGRAPH CO., WASHINGTON, D. C.

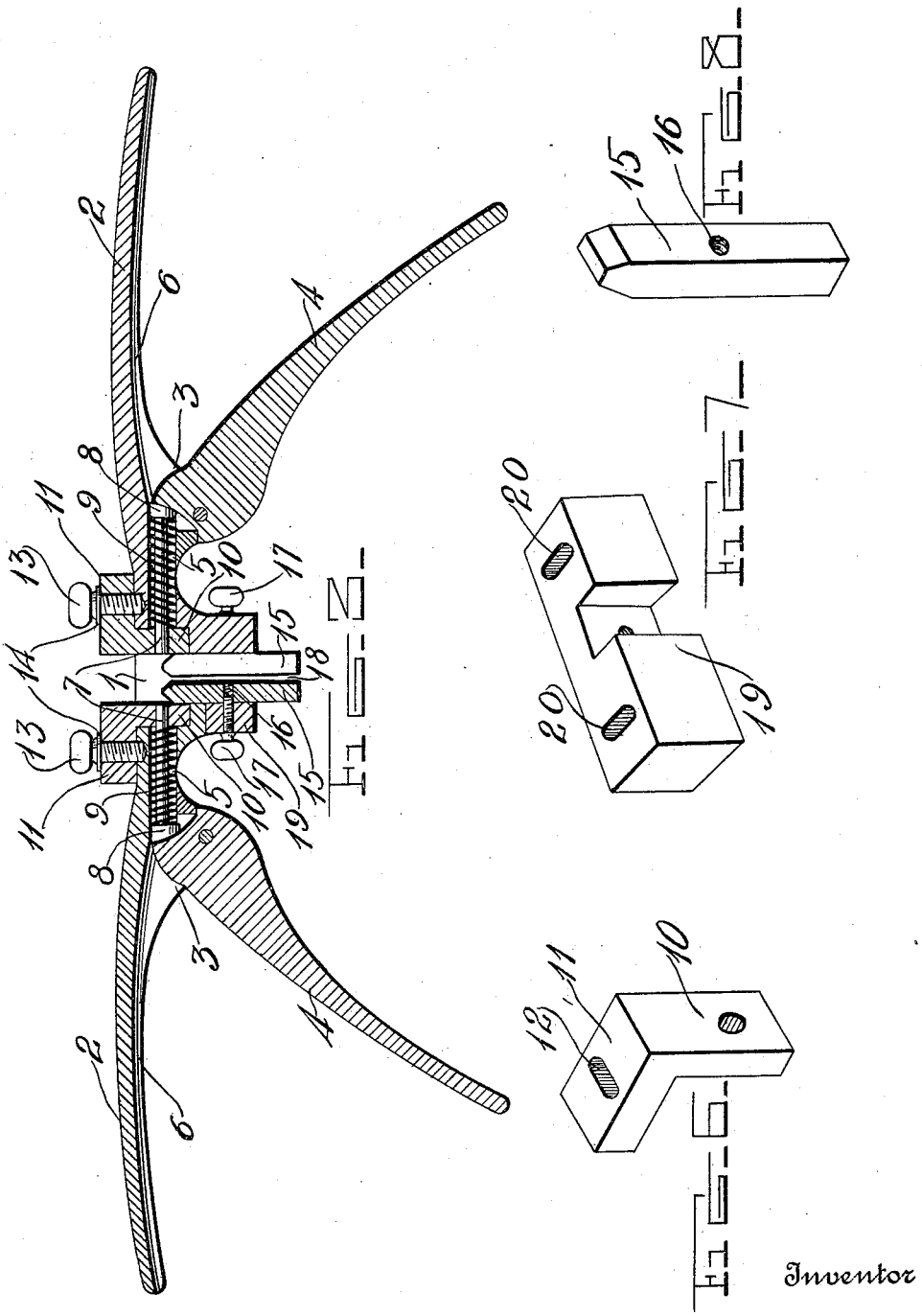

UNITED STATES PATENT OFFICE.

THEODORE C. ADAMS, OF FORT WORTH, TEXAS, ASSIGNOR OF ONE-HALF TO S. CLYDE WAGLEY, OF FORT WORTH, TEXAS.

SAW-SET.

999,356. Specification of Letters Patent. Patented Aug. 1, 1911.

Application filed October 31, 1910. Serial No. 589,944.

*To all whom it may concern:*

Be it known that I, THEODORE C. ADAMS, a citizen of the United States, residing at Fort Worth, in the county of Tarrant and State of Texas, have invented certain new and useful Improvements in Saw-Sets; and I do declare the following to be a full, clear, and exact description of the invention, such as will enable others skilled in the art to which it appertains to make and use the same.

This invention relates to improvements in saw sets.

One object of the invention is to provide an improved saw set having a double arrangement of setting devices adapted to work in opposite directions whereby two teeth may be set at each operation of the tool.

Another object of the invention is to provide an improved saw set of this character having means whereby the setting pins or plungers may be adjusted to set the teeth of fine or coarse saws or saws having any number of teeth to the inch.

A further object is to provide an improved saw set having means to adjust the same to saws of different size and having reversible anvil block provided with working faces formed at different angles whereby the teeth of the saws may be set to a greater or less extent as desired.

With these and other objects in view, the invention consists of certain novel features of construction, combination and arrangement of parts as will be more fully described and particularly pointed out in the appended claims.

In the accompanying drawings: Figure 1 is a side view of my improved saw set; Fig. 2 is a top plan view; Fig. 3 is a vertical longitudinal sectional view on the line 3—3 of Fig. 2; Fig. 4 is a cross sectional view on the line 4—4 of Fig. 1; Fig. 5 is a similar view on the line 5—5 of Fig. 1; Fig. 6 is a detail perspective view of one of the adjustable plunger supporting blocks; Fig. 7 is a similar view of one of the anvil blocks; and Fig. 8 is a similar view of the adjustable saw engaging block.

My improved saw set comprises a centrally disposed supporting frame 1 having on its opposite ends integrally formed stationary handles 2. The handles 2 have formed on their under sides adjacent to their inner ends pairs of apertured lugs 3 between which are pivotally mounted the inner ends of plunger or pin projecting handles or levers 4. In the opposite ends of the frame 1 are formed passages 5 which communicate with the grooves 6 formed in the under sides of the inner ends of the stationary handles 2. In the passages 5 and grooves 6 are arranged setting pins or plungers 7 having on their outer ends heads 8. On the pins between the heads 8 and the inner ends of the passages 5 are arranged coiled retracting springs 9 which retract and normally hold the pins or plungers in a retracted position. The pins or plungers 7 loosely engage the passages 5 and grooves 6 and have their inner ends engaged with adjustable pin guiding blocks 10 whereby said inner ends of the two pins are held out of alinement with each other to a greater or less extent thus providing for the setting of teeth which may vary in number to the inch. The blocks 10 are arranged in the opposite ends of the frame 1 and have on their upper ends right angular lugs 11 which engage the upper sides of the frame at the opposite ends thereof as shown and which have formed therein slots 12. Engaged with the slots in the lugs 11 and with threaded sockets in the ends of the frame are thumbscrews 13 between the heads of which and the lugs 11 are arranged washers 14. By means of the slots 12 and screws 13 the blocks 10 may be adjusted and secured to hold the inner ends of the plungers in the desired position and to guide the same into engagement with the teeth of the saw.

Arranged in the opposite ends of the frame 1 and opposite to the ends of the plungers or pins are anvil blocks 15 having the opposite sides of their upper ends beveled or inclined at different angles as shown. The blocks 15 are provided with threaded passages 16 with which are engaged the inner ends of fastening screws 17 one arranged in the frame and the other in a block 19 hereinafter described and by means of which the blocks are removably held in position and may be reversed to bring either of the beveled working faces into operative position thereby permitting the teeth to be set to a greater or less extent when engaged by the inner ends of the setting pins or plungers.

The frame 1 is provided in its lower portion with a notch 18 which when the tool is applied is engaged with the toothed edge of the saw blade thereby bringing the setting pins or plungers in line with the teeth. In order to regulate the width of the notch 18 to accommodate the tool to saw blades of different thicknesses I provide a spacing block 19 which is arranged on the lower side of the frame 1 and forms one side of the lower portion of the notch. The block 19 is provided with slots 20 in which are arranged set screws 21 whereby the block is fastened in adjusted positions on the frame.

By constructing and arranging the plunger pins and their operating levers as herein shown and described it will be readily seen that when the handles and levers are grasped and the levers pressed into engagement with the stationary handles that the plunger pins will be projected into forcible engagement with opposite sides of two teeth of the saw thereby bending the teeth in opposite directions and into engagement with the inclined surfaces of the anvil blocks and thus simultaneously setting two teeth at each operation of the levers.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

Having thus described my invention what I claim is:

1. In a saw set a central supporting frame, stationary handles projecting therefrom in opposite directions, a plunger projecting lever handle pivotally connected to each stationary handle, a tooth setting plunger operated by each lever handle, means for adjusting said plungers laterally, out of alinement with each other, and reversible anvil blocks having working faces formed at different angles.

2. In a saw set a supporting frame, stationary handles arranged thereon, plunger projecting handles or levers pivotally connected to said stationary handles, tooth setting pins or plungers operated by said levers and laterally adjustable, retracting springs arranged on said plungers, plunger adjusting blocks, adapted to hold the inner ends of said pins whereby said ends may be adjusted laterally to set teeth of different size, thumb screws to hold said blocks in their adjusted positions, and reversible anvil blocks having working faces formed at different angles whereby the teeth may be set to a greater or less degree.

3. In a saw set, a supporting frame having a saw engaging notch, stationary handles formed on the opposite ends thereof, plunger operating levers pivotally mounted on said stationary handles, spring retracted plungers laterally adjustable and loosely mounted in said frame and adapted to be projected by said levers, plunger adjusting blocks arranged in said frame, whereby the inner ends of said plungers are supported and laterally adjustable, reversible anvil blocks arranged in said frame said blocks having working faces formed at different angles, set screws to hold said blocks in place, and a spacing block adjustably secured to the lower side of said frame and forming one side of the saw engaging notch therein whereby the width of the notch is regulated.

In testimony whereof I have hereunto set my hand in presence of two subscribing witnesses.

THEODORE C. ADAMS.

Witnesses:
 THOS. J. HENDERSON,
 ROY B. CURBY.

Copies of this patent may be obtained for five cents each, by addressing the "Commissioner of Patents, Washington, D. C."